(12) United States Patent
Sorrentino et al.

(10) Patent No.: US 10,142,990 B2
(45) Date of Patent: Nov. 27, 2018

(54) RADIO NODE, COMMUNICATION DEVICES AND METHODS THEREIN

(71) Applicant: TELEFONAKTIEBOLAGET LM ERICSSON (PUBL), Stockholm (SE)

(72) Inventors: Stefano Sorrentino, Solna (SE); Zhenshan Zhao, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 51 days.

(21) Appl. No.: 15/114,965

(22) PCT Filed: Jan. 31, 2014

(86) PCT No.: PCT/SE2014/050127
§ 371 (c)(1),
(2) Date: Jul. 28, 2016

(87) PCT Pub. No.: WO2015/115951
PCT Pub. Date: Aug. 6, 2015

(65) Prior Publication Data
US 2017/0048856 A1   Feb. 16, 2017

(51) Int. Cl.
*H04W 72/04* (2009.01)
*H04W 88/04* (2009.01)
(Continued)

(52) U.S. Cl.
CPC ........ *H04W 72/0453* (2013.01); *H04B 1/713* (2013.01); *H04W 72/082* (2013.01); *H04W 76/14* (2018.02)

(58) Field of Classification Search
None
See application file for complete search history.

(56) References Cited

U.S. PATENT DOCUMENTS

2011/0305179 A1   12/2011   Wang et al.
2013/0272215 A1*  10/2013   Khoryaev ............ H04W 28/02
                                                    370/329
(Continued)

FOREIGN PATENT DOCUMENTS

GB    2501088 A      10/2013
WO    2011/069295 A1  6/2011
WO    2013/162333 A1  10/2013

OTHER PUBLICATIONS

3GPP TSG-RAN WG1 Meeting #74, "D2D Communication without Network Coverage"; Barcelona, Spain; Aug. 19-23, 2013; 6 pages.

*Primary Examiner* — Duc T Duong
(74) *Attorney, Agent, or Firm* — Ericsson Inc.

(57) ABSTRACT

Embodiments herein disclose a method in a radio node (12) for enabling communication between a first communication device (10) and a second communication device (11) over a device-to-device, D2D, connection in a radio communications network (1). The radio node (12) allocates radio resource bands of a carrier band for the D2D connection according to at least a first pattern for frequency hopping. The radio resource bands are used for frequency hopping over the carrier band and are at a respective carrier band edge and/or at the respective carrier band edge plus or minus a margin such that a contiguous bandwidth of radio resources between the radio resource bands is not used by the first pattern. The radio node (12) signals an indication of the allocated radio bands to the first and/or the second communication device (10,11).

23 Claims, 15 Drawing Sheets

| | | | | | | | |
|---|---|---|---|---|---|---|---|
| | D2D Bands | Pattern 1 | Pattern 2 | Pattern 1 | Pattern 2 | Pattern 1 | Pattern 2 |
| | | Pattern 3 | Pattern 4 | Pattern 3 | Pattern 4 | Pattern 3 | Pattern 4 |
| Carrier band | Contig. bandwidth | | | | | | |
| | D2D Bands | Pattern 4 | Pattern 3 | Pattern 4 | Pattern 3 | Pattern 4 | Pattern 3 |
| | | Pattern 2 | Pattern 1 | Pattern 2 | Pattern 1 | Pattern 2 | Pattern 1 |

1st Carrier band edge (top)
2nd Carrier band edge (bottom)

(51) Int. Cl.
    *H04W 72/08*    (2009.01)
    *H04B 1/713*    (2011.01)
    *H04W 76/14*    (2018.01)

(56) References Cited

U.S. PATENT DOCUMENTS

| | | |
|---|---|---|
| 2013/0273924 A1 | 10/2013 | Hakola et al. |
| 2013/0315079 A1 | 11/2013 | Edge |
| 2014/0098781 A1* | 4/2014 | Vos .................... H04W 72/1268 370/330 |
| 2014/0204898 A1 | 7/2014 | Yang et al. |
| 2014/0241260 A1 | 8/2014 | Schmidt et al. |
| 2015/0016239 A1* | 1/2015 | Yi .......................... H04J 11/003 370/201 |
| 2015/0016377 A1* | 1/2015 | Kim ...................... H04B 7/2615 370/329 |
| 2015/0173060 A1* | 6/2015 | Ge ....................... H04W 72/048 370/252 |
| 2015/0256403 A1* | 9/2015 | Li .......................... H04W 4/70 370/235 |
| 2016/0150504 A1* | 5/2016 | Chae ..................... H04W 76/14 375/133 |
| 2016/0174194 A1* | 6/2016 | Suzuki ................... H04B 1/713 370/312 |
| 2017/0150429 A1* | 5/2017 | Baldemair ............. H04W 8/005 |

* cited by examiner

RADIO NODE, COMMUNICATION DEVICES AND METHODS THEREIN

TECHNICAL FIELD

Embodiments herein relate to a radio node, communication devices and methods therein in a radio communications network. In particular, embodiments herein relate to enable communication over a device-to-device connection.

BACKGROUND

In a typical radio communications network or cellular network, wireless terminals, also known as mobile stations and/or user equipments (UEs), communicate via a Radio Access Network (RAN) to one or more core networks. The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink (DL) and/or uplink (UL) cell. DL means communication from the base station to the UE and UL means communication from the UE to the base station. The base stations communicate over the air interface operating on radio frequencies with the user equipments within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network (RAN) of an EPS has an essentially "flat" architecture comprising radio base station nodes without reporting to RNCs.

Device-to-Device (D2D) communication is widely used as a component of many existing wireless technologies, including ad hoc and cellular networks. Examples include Bluetooth and several variants of the IEEE 802.11 standards suite such as WiFi Direct. These systems operate in unlicensed spectrums of radio resources.

Recently, D2D communications as an underlay to cellular networks have been proposed as a means to take advantage of the proximity of communicating communication devices and at the same time to allow communication devices to operate in a controlled interference environment. Typically, it is suggested that such D2D communication shares the same spectrum of radio resources as the cellular network, for example by reserving some of the cellular uplink radio resources for D2D purposes. Allocating dedicated spectrum of radio resources for D2D purposes is a less likely alternative as spectrum of radio resources is a scarce radio resource and, dynamic, sharing between the D2D services and cellular services is more flexible and provides higher spectrum efficiency.

Communication devices that want to communicate, or even just discover each other, typically need to transmit various forms of direct signals/channels. The radio resources for such channels/signals may be assigned by a third controlling node such as an eNB or a control communication device, or the radio resources could be selected autonomously by the transmitting communication device, possibly within a restricted pool of available radio resources.

Multiple direct signals/channels from different communication devices are multiplexed on the same radio resources in a combination of Time Division Multiplexing (TDM), Frequency Division Multiplexing (FDM) and possibly Code Division Multiplexing (CDM). Even though details are not agreed yet, it is likely that D2D signals/channels will be multiplexed on specific subframes occurring at known, possibly signaled or configured, positions in the radio frame. This is mainly to limit the active time for the receiver.

Radio resources for transmission of data, and control channels, including discovery, may be assigned by a controlling node or be defined according to pre-configured patterns. In general, each channel from each communication device occupies a subset of the time/frequency and possibly code radio resources in the system.

Channels with different purpose or associated to, e.g., different service types may be associated to different bandwidths and/or number of Physical Radio resource Blocks (PRB).

It is also important to note that UL and D2D transmissions in LTE are assumed to exploit Single Carrier Orthogonal Frequency Division Multiplexing (SC-OFDM), i.e., single carrier modulation. This means that a given communication device can only transmit over a single contiguous subset of spectral radio resources at a given time.

It is also observed that, especially when D2D communication is performed under network coverage, UL and D2D transmissions may be possibly co-scheduled in FDM in the same subframe.

Frequency Hopping

Since interference at the receiver in a D2D system happens in a stochastic and partially uncontrollable/unpredictable fashion, it is understood [2] that frequency and/or time diversity is beneficial in the radio resource patterns used for each physical channel. In particular, the channels should span different portions of the spectrum in a pseudo-random fashion, a so called frequency hopping. Possibly, code patterns may be exploited, too.

For certain channels, feedback-based acknowledgement mechanism may not be available, e.g., control channels, broadcast communication channels, discovery channels, etc. In these cases, a possible approach is to provide blind retransmissions, i.e., transmit the same payload multiple times on different radio resources, possibly with different encoding parameters, e.g. redundancy versions. Under certain conditions the receiver might be able to reconstruct the correct information based on reception of at least some of the retransmissions of the same packet. In order to maximize the detection probability, it is useful to provide frequency hopping between packet retransmissions.

Frequency Hopping (FH) is known since LTE Rel-8, where hopping patterns that sample the frequency spectrum in a pseudo-random fashion are defined and assigned to transmitting communication devices.

The combination of radio resource patterns with frequency hopping and possibly channels with different bandwidth requirements results in an inefficient use of the spectrum of radio resources.

SUMMARY

An object of embodiments herein is to provide a mechanism that enables communication in a radio communications network in an efficient manner.

According to an aspect the object is achieved by a method in a radio node for enabling communication between a first communication device and a second communication device over a device-to-device, D2D, connection in a radio communications network. The radio node allocates radio resource bands of a carrier band for the D2D connection according to at least a first pattern for frequency hopping. The radio resource bands are used for frequency hopping over the carrier band and are at a respective carrier band edge and/or at the respective carrier band edge plus or minus a margin such that a contiguous bandwidth of radio resources between the radio resource bands is not used by the first pattern. The radio node signals an indication of the allocated radio resource bands to the first communication device and/or the second communication device.

According to another aspect the object is achieved by a method in a first communication device for enabling communication between the first communication device and a second communication device over a D2D connection in a radio communications network. The first communication device obtains an indication of radio resource bands of a carrier band according to at least a first pattern for frequency hopping for the D2D connection. The radio resource bands are at a respective carrier band edge and/or at the respective carrier band edge plus or minus a margin such that a contiguous bandwidth of radio resources between the radio resource bands is not used by the first pattern. The first communication device uses the indication when setting up the D2D connection to the second communication device.

According to yet another aspect the object is achieved by a method in a second communication device for enabling communication between a first communication device and the second communication device over a D2D connection in a radio communications network. The second communication device obtains an indication of radio resource bands of a carrier band according to at least a first pattern for frequency hopping for the D2D connection. The radio resource bands are at a respective carrier band edge and/or at the respective carrier band edge plus or minus a margin such that a contiguous bandwidth of radio resources between the radio resource bands is not used by the first pattern. The second communication device receives, from the first communication device and/or the radio node, an indication of radio resource bands of a pattern used in the D2D connection, and the second communication device uses the pattern indicated by the received indication for communicating with the first communication device.

According to still another aspect the object is achieved by a radio node for enabling communication between a first communication device and a second communication device over a D2D connection in a radio communications network. The radio node comprises processing means configured to allocate radio resource bands of a carrier band for the D2D connection according to at least a first pattern for frequency hopping. The radio resource bands are used for frequency hopping over the carrier band and are at a respective carrier band edge and/or at the respective carrier band edge plus or minus a margin such that a contiguous bandwidth of radio resources between the radio resource bands is not used by the first pattern. The processing means is configured to signal an indication of the allocated radio resource bands to the first communication device and/or the second communication device.

According to yet still another aspect the object is achieved by a first communication device for enabling communication between the first communication device and a second communication device over D2D connection in a radio communications network. The first communication device comprises processing means configured to obtain an indication of radio resource bands of a carrier band according to at least a first pattern for frequency hopping for the D2D connection. The radio resource bands are at a respective carrier band edge and/or at the respective carrier band edge plus or minus a margin such that a contiguous bandwidth of radio resources between the radio resource bands is not used by the first pattern. The processing means is configured to use the indication when setting up the D2D connection to the second communication device.

According to yet still another aspect the object is achieved by a second communication device for enabling communication between a first communication device and the second communication device over a D2D connection in a radio communications network. The second communication device comprises processing means configured to obtain an indication of radio resource bands of a carrier band according to at least a first pattern for frequency hopping for the D2D connection. The radio resource bands are at a respective carrier band edge and/or at the respective carrier band edge plus or minus a margin such that a contiguous bandwidth of radio resources between the radio resource bands is not used by the first pattern. The processing means are further configured to receive from the first communication device and/or a radio node, an indication of radio resources of a pattern used in the D2D connection. The processing means is further configured to use the pattern indicated by the received indication for communicating with the first communication device.

Embodiments herein disclose a solution that uses radio resources in an efficient manner as a contiguous bandwidth between the radio resource bands is obtained that may be used for other communication.

BRIEF DESCRIPTION OF THE DRAWINGS

Embodiments will now be described in more detail in relation to the enclosed drawings, in which.

DETAILED DESCRIPTION

Figure 1:
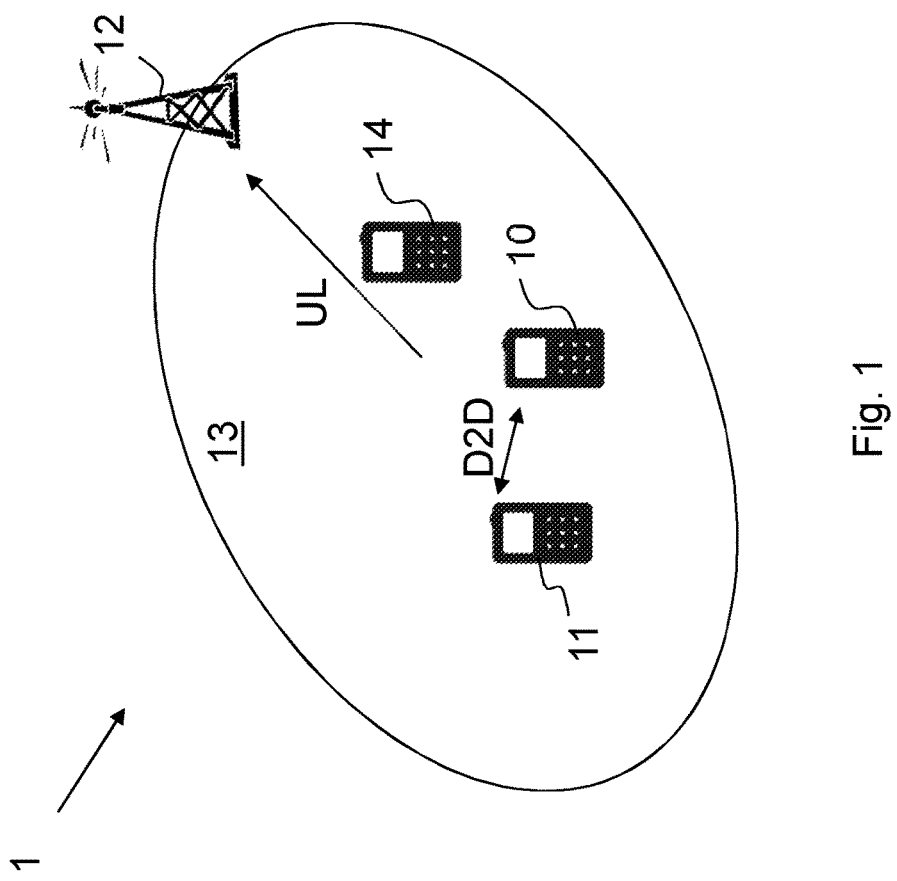
FIG. 1 shows a schematic overview depicting a radio communications network according to embodiments herein.

Embodiments herein relate to radio communications networks in general and in particular to networks doing positioning measurements. FIG. 1 is a schematic overview depicting a radio communications network 1. The radio communications network 1 comprises one or more Radio Access Networks (RAN) and one or more Core Networks (CN). The radio communications network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The radio communications network 1 is exemplified herein as an LTE network.

In the radio communications network 1, a first communication device 10, also known as a mobile station, a user equipment, communication device, and/or a wireless terminal, may communicate via a RAN to one or more CNs. It should be understood by the skilled in the art that "first communication device" is a non-limiting term which means any wireless terminal, user equipment, Machine Type Communication (MTC) communication device, a device to device (D2D) terminal, or node e.g. Personal Digital Assistant (PDA), laptop, mobile, sensor, relay, mobile tablets or even a small base station communicating within a cell.

Furthermore, in the radio communications network 1 a similar communication device, a second communication device 11, is configured to communicate with the first communication device 10 directly, without communicating with a radio node, over a device-to-device (D2D) connection. Similarly, the first communication device 10 is configured to communicate with the second communication device 11 directly, without communicating with a radio node, over a D2D connection. The second communication device 11 may also be known as a mobile station, a user equipment, communication device, and/or a wireless terminal, may communicate via a RAN to one or more CNs. It should be understood by the skilled in the art that "second communication device" is a non-limiting term which means any wireless terminal, user equipment, Machine Type Communication (MTC) communication device, a D2D terminal, or node e.g. Personal Digital Assistant (PDA), laptop, mobile, sensor, relay, mobile tablets or even a small base station communicating within a cell.

The radio communications network 1 covers a geographical area which is divided into cell areas, e.g. a cell 13 being served by a radio node 12. The radio node 12 may also be referred to as a base station and e.g. a NodeB, an evolved Node B (eNB, eNode B), a base transceiver station, a radio network controller, Access Point Base Station, base station router, or any other network unit capable of communicating with a user equipment within the cell served by the radio base station depending e.g. on the radio access technology and terminology used. The radio node 12 may serve one or more cells, such as the cell 13.

A cell is a geographical area where radio coverage is provided by radio base station equipment at a base station site and/or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 13 uniquely in the whole radio communications network 1 is also broadcasted in the cell 13. The radio node 12 communicates over the air or radio interface operating on radio frequencies with the user equipment 10 within range of the radio node 12. The first/second communication device 10/11 transmits data over the radio interface to the radio node 12 in Uplink (UL) transmissions and the radio node 12 transmits data over an air or radio interface to the communication devices in Downlink (DL) transmissions.

Frequency Hopping (FH), where hopping patterns that sample the frequency spectrum in a pseudo-random fashion are defined and assigned to transmitting communication devices.

As part of developing embodiments herein, especially when multiple communication devices transmit over D2D channels over a same subset of subframes with each other's and/or UL signaling occurs, at least one or more of the following problems may occur if a pattern for frequency hopping similar to legacy LTE UL is used:

The patterns for frequency hopping of different D2D communications are independent and create possibly very fractioned spectrum. It is difficult for the Network (NW) or network node to exploit the available spectrum fractions for scheduling UL because of the single-carrier allocation constraint.

It is difficult for a node, such as the radio node 12 or the communication devices, to predict which radio resources, such as frequency resources, time resources, or code resources, are likely free from interference at future subframes, based on measurements at previous subframes. Such information is of interest for, e.g., communication devices that are going to transmit D2D channels in a future subframe.

It is expensive from a signaling perspective for a communication device to report to another node, such as another communication device or the radio node 12, which patterns are used for frequency hopping and/or which patterns are free from interference.

The above issues become more severe when mixtures of communication devices with different D2D channel bandwidths use the spectrum of radio resources.

Embodiments herein use ordered patterns of radio resource bands with frequency hopping. A first pattern only occupies most external radio resource bands of a carrier band, in an alternating fashion, and successive or following patterns occupy radio resource bands that are either progressively closer to a carrier center of the carrier band, or occupy a same frequency subband, but a different time instance than the radio resource bands of the first pattern. Hence, one or more patterns out of multiple patterns may be allocated to a D2D connection. And a contiguous bandwidth for e.g. a UL connection for a third communication device 14 to the radio node 12 is not used by the first pattern or any of the multiple patterns. Each pattern may be "narrowband", e.g., associated to the bandwidth of the smallest D2D channel. Such multiple patterns are known, specified or configured, also called obtained herein, for all nodes participating to D2D communication. Multiple patterns may be arranged in an ordered indexed list, wherein each index indicates a pattern of frequency hopping. For example index '1' indicates pattern 1, index '2' indicates pattern 2 etc.

The above property of the patterns can be exploited in different ways:

When larger bandwidth is required for a given D2D channel, multiple adjacent patterns can be combined into a jointed pattern with larger channel bandwidth. This guarantees minimum radio resource fractioning, while preserving FH gain.

Wherein multiple patterns are used, the multiple patterns may be ordered using indices, e.g. first pattern has index one and a second pattern may have index two. When autonomously selecting D2D radio resources, nodes should select the free FH pattern with lowest index. This guarantees minimum radio resource fractioning, while preserving FH gain.

When signaling the index of used pattern or patterns, also referred to as D2D pattern or frequency hopping pattern, it is sufficient to report the highest index of the occupied/interfered patterns, or equivalently the lowest index of the free patterns.

D2D communication and UL communication may share the same UL radio resource. The radio resource of D2D is assigned by control node or pre-configured. To explore frequency hopping in D2D, it is better to allocate e.g. two separate subbands to D2D at the carrier band edge which would reduce radio resource fractioning of e.g. a data channel allocated between the subbands. Embodiments herein fully exploit FH gains without incurring in e.g. frequency radio resources fractioning and cumbersome signalling and utilization of free radio resources.

Figure 2:
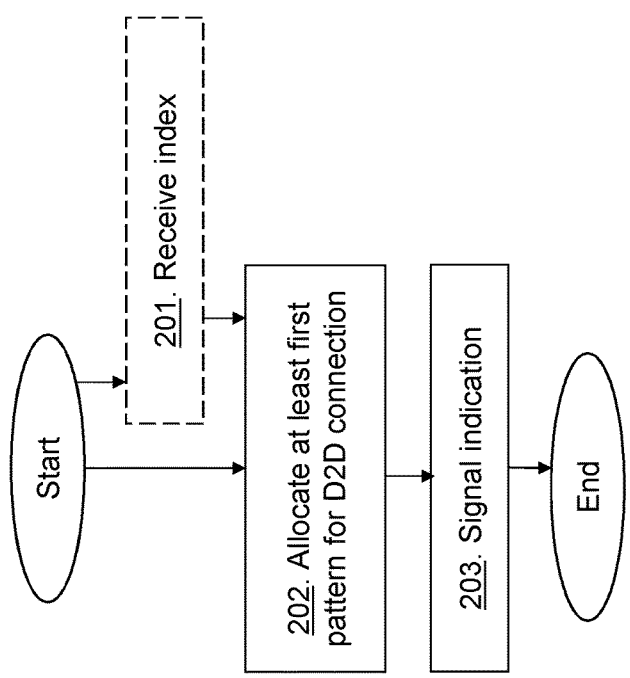
FIG. 2 shows a schematic flowchart depicting a method in a radio node according to embodiments herein.

The method actions in the radio node 12 for enabling communication between the first communication device 10 and the second communication device 11 over a D2D connection in the radio communications network 1 according to some embodiments will now be described with reference to a flowchart depicted in FIG. 2. The actions do not have to be taken in the order stated below, but may be taken in any suitable order. Actions performed in some embodiments are marked with dashed boxes. The radio node 12 may be configured with an indexed list of patterns indicating radio resource bands of respective pattern of multiple patterns.

Action 201.

The radio node 12 may receive an index of a pattern from the first communication device 10. The index may indicate an interference-free pattern or a pattern, used or not used by the first communication device 10.

Action 202.

The radio node 12 allocates radio resource bands of a carrier band for the D2D connection according to at least a first pattern, e.g. pattern 1 or pattern 3 illustrated in FIGS. 7-12, for frequency hopping. The radio resource bands are used for frequency hopping over the carrier band and are at a respective carrier band edge and/or at the respective carrier band edge plus or minus a margin such that a contiguous bandwidth of radio resources between the radio resource bands is not used by the first pattern.

The first pattern of multiple patterns employs radio resources with index x, where $$x: \{k_x; N-1-t_x\},$$

wherein N defines a number of radio resource blocks of the carrier band and function $k_x$ defines the margin to a first radio resource block of the first pattern from a first carrier band edge and $N-1-t_x$ defines another radio resource block wherein $t_x$ defines the margin to a second carrier band edge, and x is the index indicating the first pattern. $k_x$ and $t_x$ may be based on index of the first pattern. $k_x$ and $t_x$ may be defined as $$k_x = k'_x + k_0 \text{ and } t_x = t'_x + t_0,$$

wherein $k'_x$ and $t'_x$ are pattern specific and $k_0$ and $t_0$ are common margin values for multiple patterns, e.g. patterns 1-4. The margin may be based on radio resource band of a control channel such as the PUCCH. 'x' may take the pattern value of the respective pattern number, e.g. 1, 2, 3 or 4. The indices may be in a list of indices wherein each index indicates a pattern for frequency hopping.

The radio resource bands of a successive or following pattern, for example pattern 2, to the first pattern occupy radio resource bands that occupy a same frequency subband, but at a different time instance than the radio resource bands of the first pattern. Alternatively or additionally, the radio resource bands of a successive or following pattern, e.g. Pattern 3 or 4, to the first pattern occupy radio resource bands that are progressively closer to a center carrier of the carrier band than the radio resource bands of the first pattern.

In some embodiments an uplink communication by the third communication device 14 to a radio node, such as the radio node 12 or a different radio node, uses radio resources of the carrier band. At least a fraction of the contiguous bandwidth is for an uplink channel, such as shared uplink channel. E.g. a bandwidth for a Physical Uplink Shared Channel (PUSCH) is continuous and not fractioned according to embodiments herein.

In some embodiments the radio node allocates one or more patterns that are contiguous in frequency domain with the first pattern and the one or more patterns are combined with the first pattern to obtain a joint pattern of a desired bandwidth.

The radio node 12 may take the received indication of interference free pattern into account when allocating the first pattern, e.g. when pattern 2 is reported as an interference free pattern the radio node 12 may allocate pattern 2 for the D2D connection.

Action 203.

The radio node 12 signals an indication of the allocated radio resource bands, such as an index of the first pattern, to the first communication device 10 and/or the second communication device 11. In some embodiments the radio node may signal, to the first communication device 10 and/or the second communication device 11, an index, being the indication, of the first pattern in the joint pattern with a lowest index when assigning radio resource bands.

Figure 3:
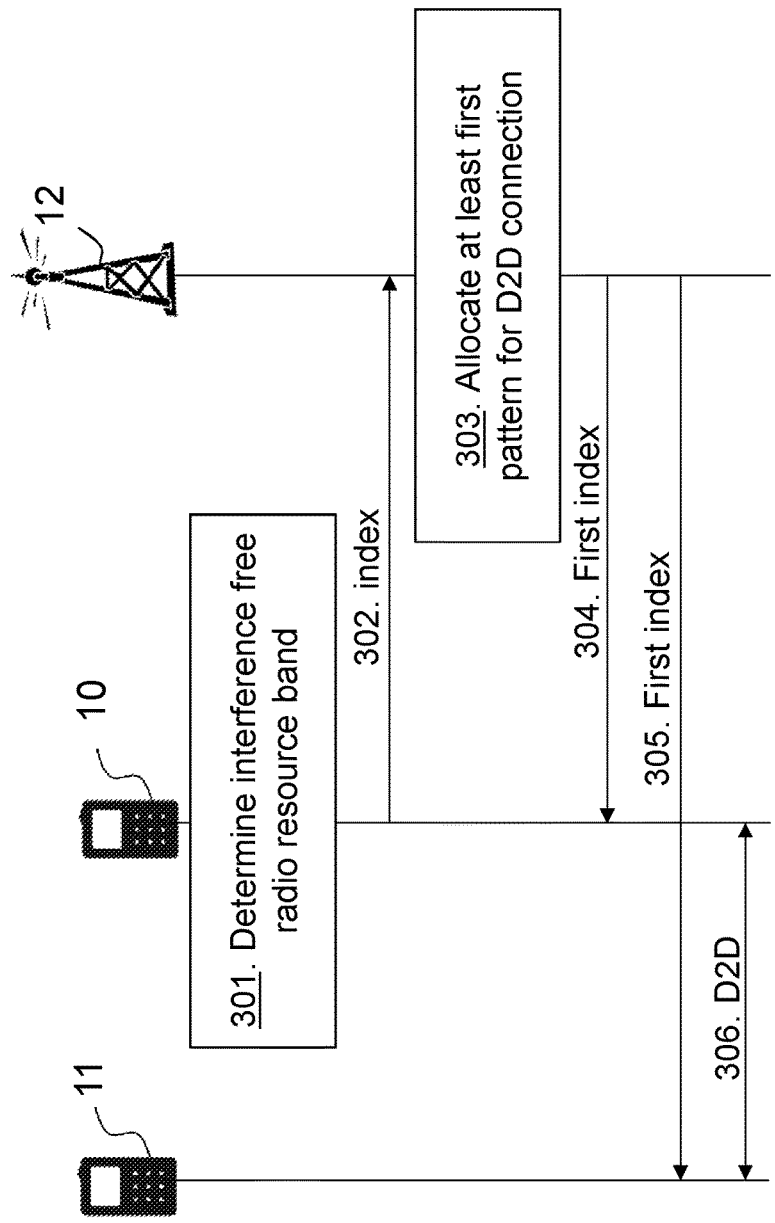
FIG. 3 shows a combined flowchart and signalling scheme in a radio communications network according to some embodiments herein.

FIG. 3 is a combined schematic flowchart and signalling scheme according to embodiments herein for setting up a D2D connection between the first communication device 10 and the second communication device 11.

Action 301.

The first communication device 10 determines a pattern for frequency hopping that is interference free, or has an interference below a certain threshold defining an interference free pattern.

Action 302.

The first communication device 10 may then send an indication, such as an index or similar, indicating the determined pattern to the radio node 12.

Action 303.

The radio node 12 allocates, selects or chooses, radio resource bands of a first pattern for frequency hopping to the first communication device 10 for the D2D connection to the second communication device 11. The first pattern may be e.g. the pattern corresponding to the index received. This corresponds to the action 202 in FIG. 2. Furthermore, the radio node 12 may allocate a plurality of patterns depending on amount of data traffic needed or indicated as needed.

Action 304.

The radio node 12 may then transmit an index of the allocated pattern to the first communication device 10. This corresponds to action 203 in FIG. 2.

Action 305.

The radio node 12 may additionally or alternatively transmit the index of the pattern to the second communication device 11. This corresponds to action 203 in FIG. 2. It should be noted that the radio node 12 does not necessarily need to inform the second communication device 11 of the allocated pattern, instead it may be the first communication device 10 that informs the second communication device 11 of the received index.

Action 306.

The first communication device 10 and the second communication device 11 then uses the pattern indicated by the received index and sets up the D2D connection.

Figure 4:
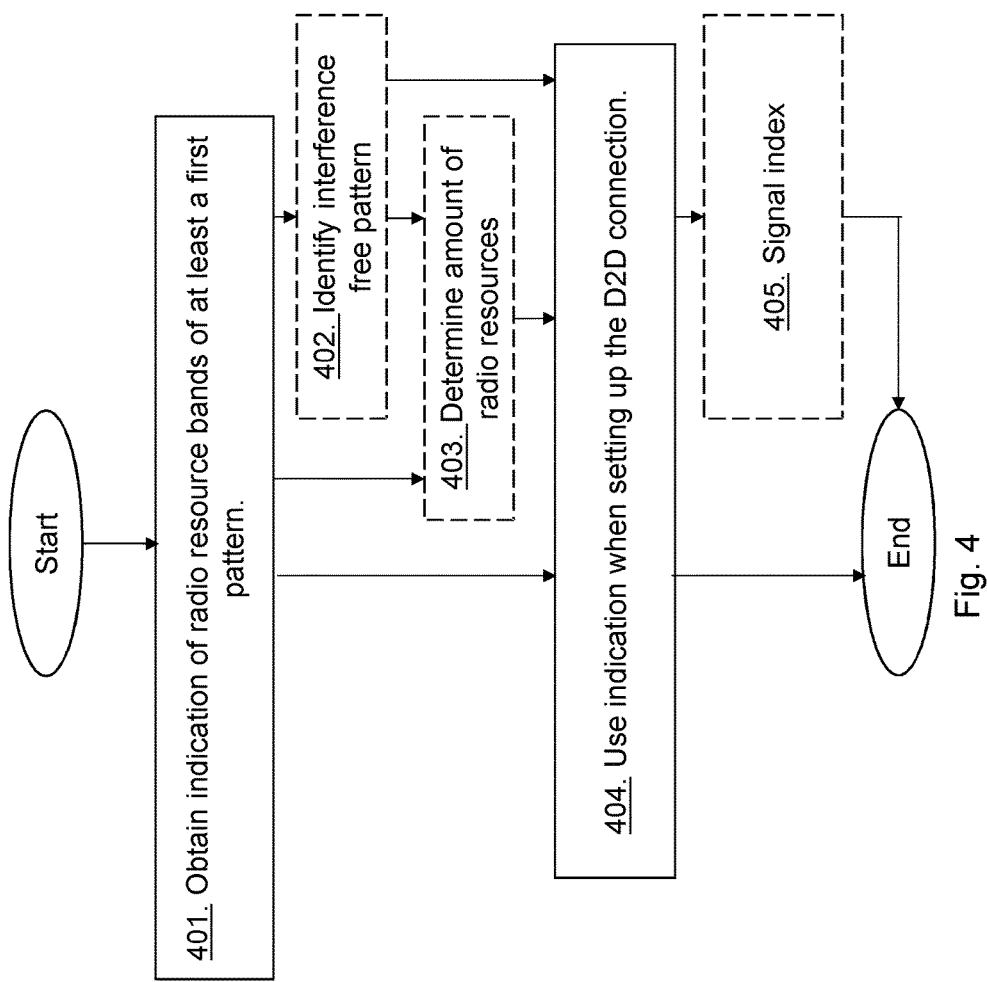
FIG. 4 shows a schematic flowchart depicting a method in a first communication device according to embodiments herein.

The method actions in the first communication device 10 for enabling communication between the first communication device 10 and the second communication device 11 over a D2D connection in the radio communications network 1 according to some embodiments will now be described with reference to a flowchart depicted in FIG. 4. The actions do not have to be taken in the order stated below, but may be taken in any suitable order. Actions performed in some embodiments are marked with dashed boxes.

Action 401.

The first communication device 10 obtains an indication of radio resource bands of a carrier band according to at least a first pattern for frequency hopping for the D2D connection. The radio resource bands are at a respective carrier band edge and/or at the respective carrier band edge plus or minus a margin such that a contiguous bandwidth of radio resources between the radio resource bands is not used by the first pattern. Not used herein means that a certain measurement shows low energy on at least a subset of radio resources that are contiguous in bandwidth to the first pattern. The first communication device 10 may e.g. receive the indication from a radio node, such as the radio node 12 or a core node or similar, in the radio communications network 1, or may retrieve the indication from a memory within the first communication device 10.

Action 402.

In some embodiments, the first communication device 10 obtains indications of radio resource bands of more than one pattern of radio resources bands. The first communication device 10 may then identify an interference-free pattern that is closest to the carrier band edges or with a lowest index among the patterns. E.g. the first communication device 10 may be configured with an indexed list of patterns indicating radio resource bands of respective pattern of multiple patterns.

Action 403.

In some embodiments, the first communication device 10 determines amount of radio resources needed to transmit data.

Action 404.

The first communication device 10 further uses the indication when setting up the D2D connection to the second communication device. E.g. the first communication device 10 may receive an index from the radio node 12, when patterns are indexed, indicating allocated pattern for D2D connection. The first communication device 10 may then use the radio bands of that pattern for frequency hopping when communicating directly with the second communication device 11. In some embodiments, the first communication device 10 may use the identified interference-free pattern to set up the D2D connection. Alternatively, the first communication device 10 may report the index of the identified interference-free pattern to the radio node 12 and/or the second communication device 11. The first communication device 10 may take the determined amount into account when setting up the D2D connection. In some embodiments the first communication device 10 obtains in action 401 that a successive or following pattern is contiguous in frequency domain with the first pattern and the first communication device 10 combines the successive or following pattern with the first pattern to obtain a joint pattern of a desired bandwidth. This may be based on the determined amount of radio resources needed in action 403.

Action 405.

The first communication device 10 may then signal, to the second communication device 11 and/or the radio node 12, an index of the successive or following pattern in the joint pattern with a highest index. Alternatively or additionally may the first communication device 10 signal, to the second communication device 11 and/or the radio node 12, an index of a pattern used in the D2D connection.

Figure 5:
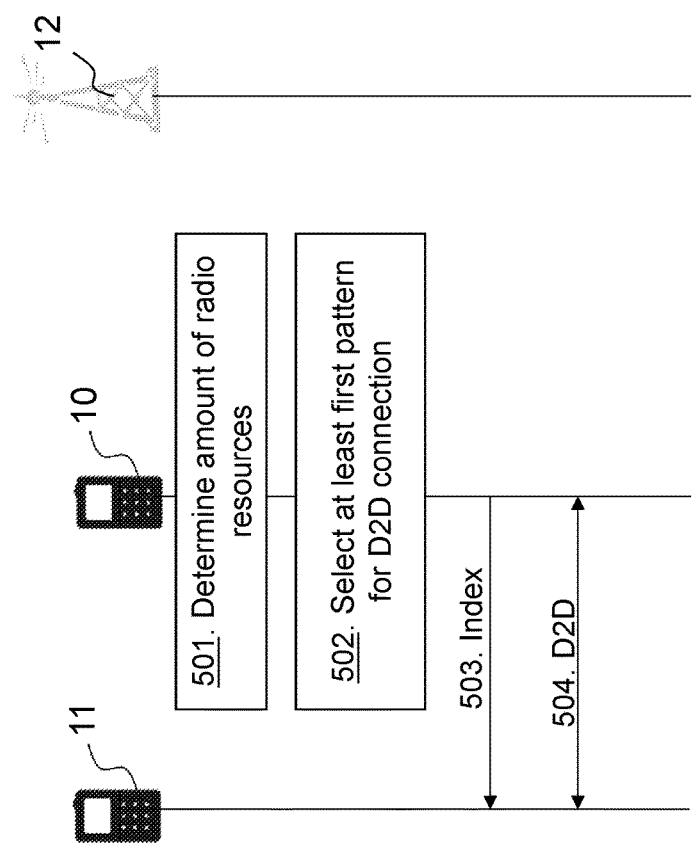
FIG. 5 shows a combined flowchart and signalling scheme in a radio communications network according to some embodiments herein.

FIG. 5 is a schematic combined flowchart and signalling scheme depicting some embodiments of setting up a D2D connection between the first communication device 10 and the second communication device 11. The first communication device 10 may have obtained the different patterns during a configuration from the radio node 12.

Action 501.

The first communication device 10 may determine amount of radio resources needed to transmit data to the second communication device 11. This corresponds to action 403 in FIG. 4.

Action 502.

The first communication device 10 uses the obtained different patterns and the determined amount of data to be transmitted to select at least a first pattern to be used to set up the D2D connection. This corresponds to action 404 in FIG. 4.

Action 503.

The first communication device 10 may then transmit the index of the selected pattern to the second communication device 11. This corresponds to action 405 in FIG. 4.

Action 504.

The first communication device 10 and the second communication device 11 may then use the transmitted index to set up the D2D connection.

Figure 6:
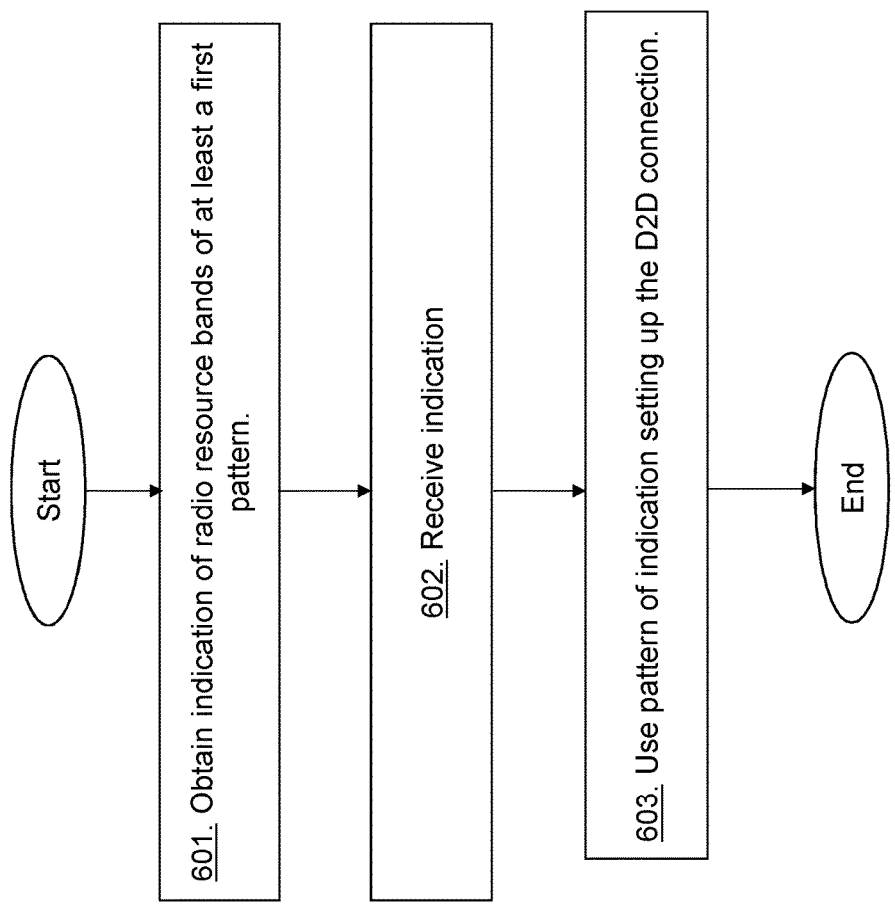
FIG. 6 shows a schematic flowchart depicting a method in a second communication device according to embodiments herein.

The method actions in second communication device 11 for enabling communication between the first communication device 10 and the second communication device 11 over a D2D connection in the radio communications network 1 according to some embodiments will now be described with reference to a flowchart depicted in FIG. 6. The actions do not have to be taken in the order stated below, but may be taken in any suitable order.

Action 601.

The second communication device 11 obtains an indication of radio resource bands of a carrier band according to at least a first pattern for frequency hopping for the D2D connection. The radio resource bands are at a respective carrier band edge and/or at the respective carrier band edge plus or minus a margin such that a contiguous bandwidth of radio resources between the radio resource bands is not used by the first pattern. The second communication device 11 may obtain the indication from the first communication device or the radio node 12 or may obtain it from a memory within the second communication device 11. E.g. the second communication device may be configured with an indexed list of patterns indicating radio resource bands of respective pattern of multiple patterns.

Action 602.

The second communication device 11 receives from the first communication device 10 and/or the radio node 12 an indication of radio resources of a pattern, e.g. an index of a pattern, used in the D2D connection.

Action 603.

The second communication device 11 then uses the pattern indicated by the received indication for communicating with the first communication device 10. This correspond to the action 306 in FIG. 3 and action 504 in FIG. 5.

Considering coexisting with PUCCH and possibility of different D2D channel bandwidth, several embodiments of the definition of patterns are proposed as follows. The embodiments may be combined in different ways and affect transmitters, receivers and eventual control nodes e.g., eNBs or controlling UEs.

Figure 7:
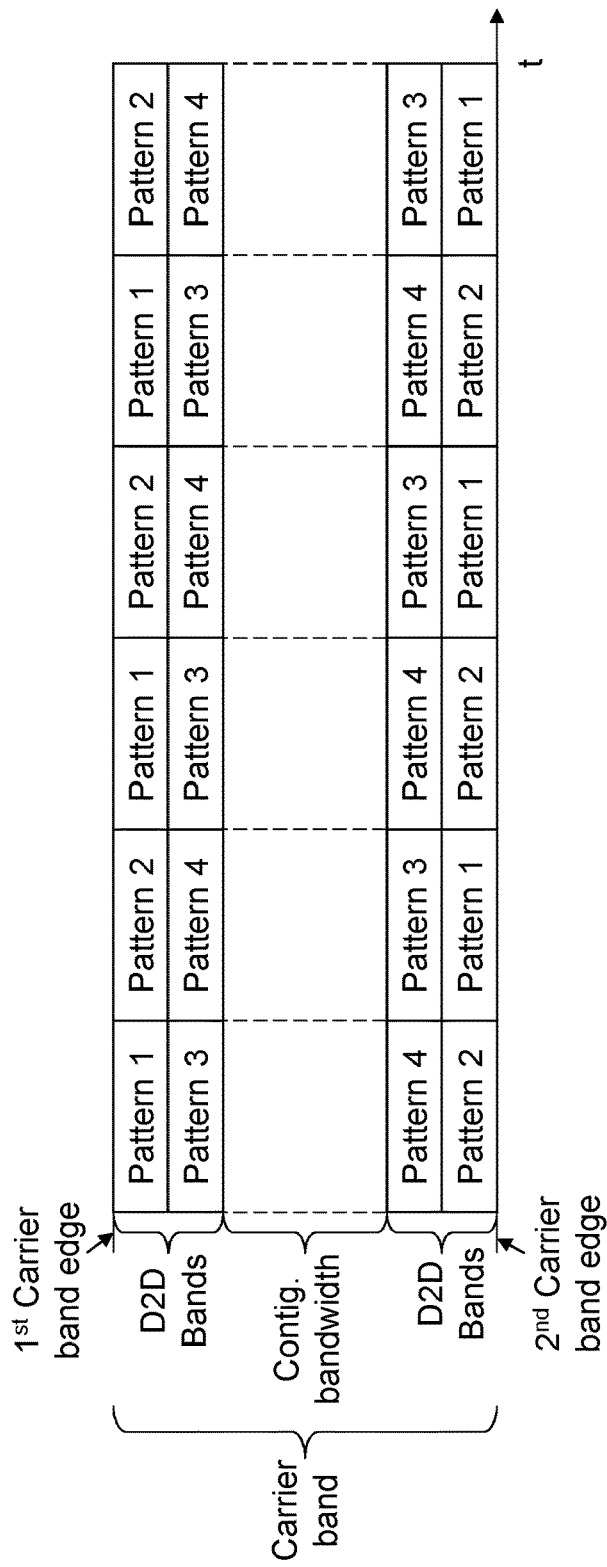
FIG. 7 shows patterns for frequency hopping according to some embodiments herein.

In some embodiments, see FIG. 7, the definition of radio resource patterns for frequency hopping are configured such that the first pattern only occupies the most external radio resources and successive or following patterns occupy radio resources that are either progressively closer to the carrier center, or occupy a same frequency subband, but a different time instance than the radio resource bands of the first pattern. The patterns are known by at least the node selecting the patterns, the first communication device 10 transmitting the patterns and the second communication device 12 potentially receiving such patterns. E.g., the patterns may be standardized, possibly for different carrier bandwidths.

A first pattern, Pattern 1, comprises radio resource bands at a first carrier band edge and, at a second subframe, at a second carrier band respectively. The frequency hopping is carried out over these to radio resource bands.

A second pattern, Pattern 2, comprises radio resource bands at the second carrier band edge and, at the second subframe, at the first carrier band edge respectively.

A third pattern, Pattern 3, comprises radio resource bands contiguous in frequency domain with the first pattern, Pattern 1. A fourth pattern, Pattern 4, comprise radio resource bands contiguous in frequency domain with the second pattern, Pattern 2. Hence, successive or following patterns of the first pattern, such as the third and fourth pattern, occupy radio resources that are either progressively closer to the carrier center, or occupy a same frequency subband, but a different time instance than the radio resource bands of the first pattern.

Each pattern periodically selects radio resources close to both band edges, in order to achieve the FH gain. The periodicity could be one subframe or several subframes.

Each pattern is narrowband and does not exceed the bandwidth of the narrowest physical channel to be transmitted over the considered radio resources.

Preferably, the defined patterns are orthogonal to each other, i.e., they occupy different sets of radio resources. The different patterns are als0 referred to as the D2D bands.

Example of embodiment 1. UL transmissions may happen in the band-center part (not shown in the picture) but indicated as a contiguous bandwidth not used by any of the patterns. Thus, the bandwidth for e.g. PUSCH is continuous and not fractioned, differently from prior art. This suits UL single-carrier allocations.

The patterns may be allocated to different D2D connections between different communication devices. E.g. Pattern 1 may be allocated to a first D2D connection, Pattern 2 to a second D2D connection, Pattern 3 to a third D2D connection and Pattern 4 to a fourth D2D connection. Furthermore, the contiguous bandwidth is not used by any of the Patterns 1-4.

Figure 8:
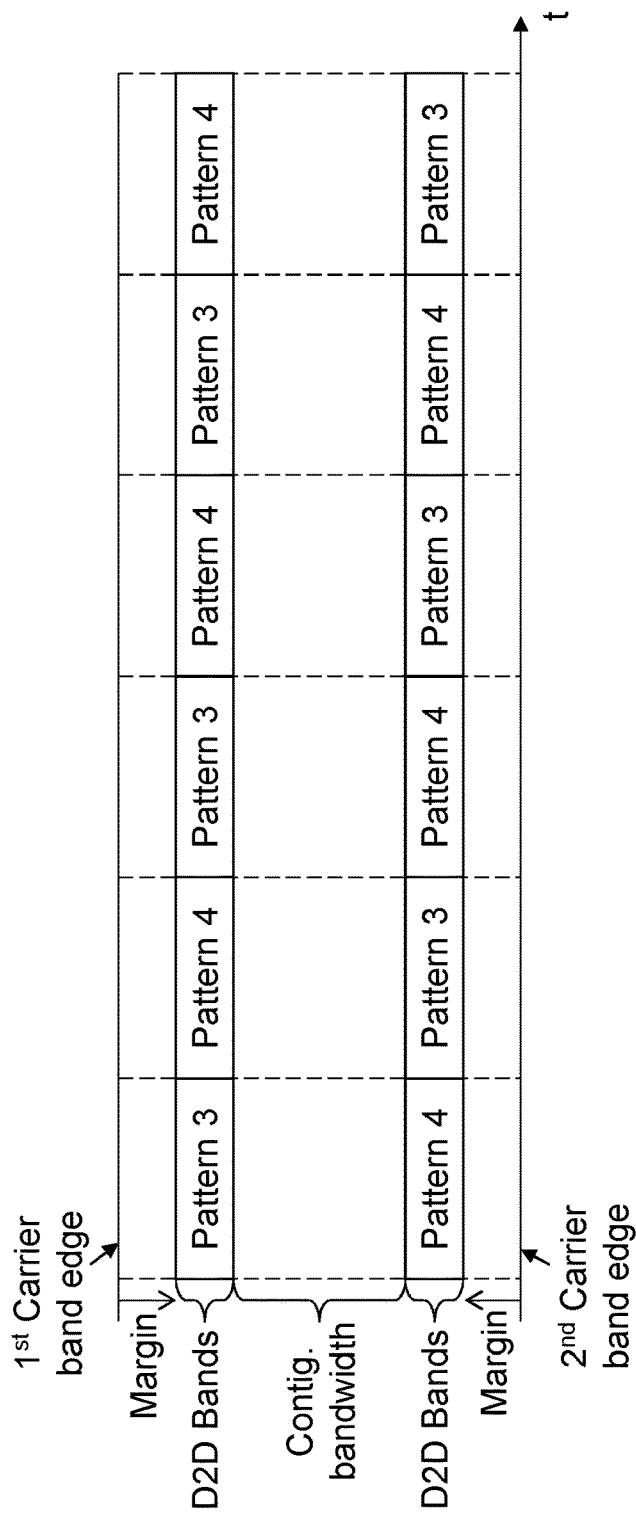
FIG. 8 shows patterns for frequency hopping according to some embodiments herein.

Even though embodiments herein are described as if the D2D radio resource patterns are able to occupy the whole carrier bandwidth, limitations can be applied in order to avoid transmitting D2D at band edge radio resources that are typically used for other transmissions, such as e.g., PUCCH. Various options are possible, such as:

A controlling node configures communication devices such that a number of patterns close to band edges or to sensitive channels such as PUCCH are reserved and cannot be used for D2D, see FIG. 8. Such reserved radio resources should not be considered for D2D channels or for radio resources used for reporting. FIG. 8 discloses wherein Pattern 1 and Pattern 2 are reserved not used for D2D connection. Instead Pattern 3 is here the first pattern used for frequency hopping in the D2D connection and placed at a margin from the 1$^{st}$ carrier band edge and 2$^{nd}$ carrier band edge.

Figure 9:
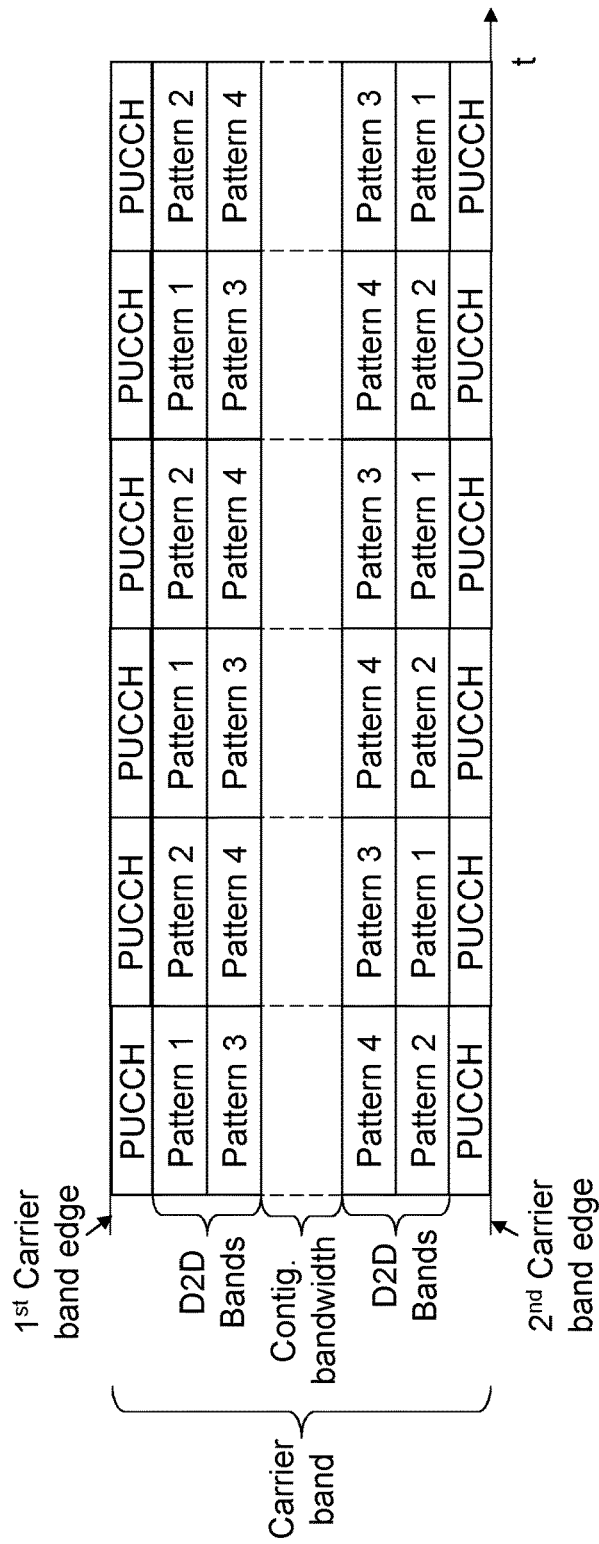
FIG. 9 shows patterns for frequency hopping according to some embodiments herein.

The D2D useful bandwidth is moved towards carrier center and the D2D patterns are defined starting from the carrier band edges plus/minus a certain margin (offset), see FIG. 9. Such margin may be configured by a control node such as the radio node 12 or be predefined. FIG. 9 shows patterns that are moved towards carrier center in order to leave space for PUCCH and possibly some guard band. The contiguous bandwidth is reduced compared to previous shown examples.

Referring back to the definition of the first pattern of multiple patterns. The patterns employ radio resources with index x, e.g. '1' for the first pattern. The index 'x' defines the radio resources to use in a definition $\{k_x; N-1-t_x\}$. N defines a number of radio resource blocks of the carrier band and function $k_x$ defines the margin to a first radio resource, e.g. a resource block, of the first pattern from a first carrier band edge and N−1−$t_x$ defines another radio resource. The radio resources may be numbered from 0-7. '$t_x$' defines the margin to a second carrier band edge, and x is the index indicating the pattern, e.g. the first pattern. E.g. when N is eight RBs, $k_x$ is one RB and $t_x$ is two RB, the radio resource band used for the first pattern is one RB at each of carrier band edge, the contiguous bandwidth not used by the first pattern is three RBs between the third RB to the fifth RB. Index '1': {1; 5} indicated that the first radio resource band is the second RB or RB1 and the second radio resource band is the sixth RB or RB5.

In some embodiments '$k_x$' and '$t_x$' may be based on index of the first pattern. $k_x$ and $t_x$ may be defined as $k_x = k'_x + k_0$ and $t_x = t'_x + t_0$, wherein $k'_x$ and $t'_x$ are pattern specific and $k_0$ and $t_0$ are common margin values for multiple patterns, e.g. patterns 1-4. E.g. when N is eight RBs, $k_0$ is one RB, $t_0$ is two RBs and for the third pattern $k'_x$ is one RB and $t'_x$ is one RB, the contiguous bandwidth not used by any of the pattern, is one RB being the fourth RB. The index '3' would then define frequency hopping between the RBs {2;4}.

Figure 10:
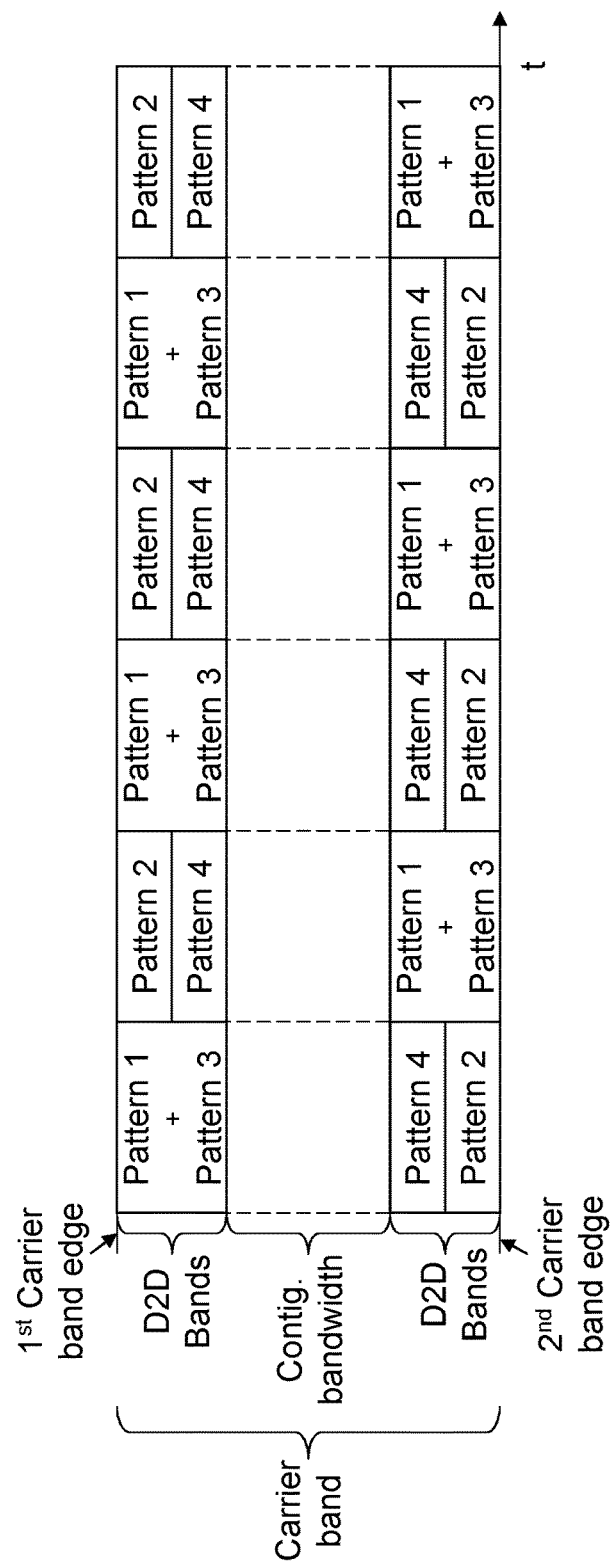
FIG. 10 shows patterns for frequency hopping according to some embodiments herein.

In some embodiments, rules are defined for radio resource allocation when the D2D channel has a bandwidth that is larger than the radio resource pattern bandwidth, i.e. the communication requires more than one pattern. In such case, multiple patterns that are contiguous in frequency domain may be combined to obtain a joint pattern of the required or desired bandwidth. It is sufficient to signal an index of the lowest pattern in the joint set of patterns when assigning radio resources as the communication devices 10,11 know what amount of radio resources are required, e.g., when D2D radio resources are assigned by a control node, such as the radio node 12. FIG. 10 discloses an embodiment wherein the pattern 1 and pattern 3, contiguous in frequency domain, are combined into a joint pattern.

In some embodiments, when the first communication device 10 selects a pattern for transmission, the first communication device 10 may perform the following steps:

Identify the interference-free pattern with lowest index, i.e., the pattern that is closest to the band edges, among the available ones. This corresponds to action 402 in FIG. 4. The first communication device 10 may identify the interference-free pattern based e.g. on energy detection, detection of signals, or similar criteria.

Use such patter for transmission of D2D channels. This corresponds to action 404 in FIG. 4. Possibly, multiple adjacent patterns may be used if the D2D channel bandwidth is larger than a single pattern bandwidth.

Figure 11:
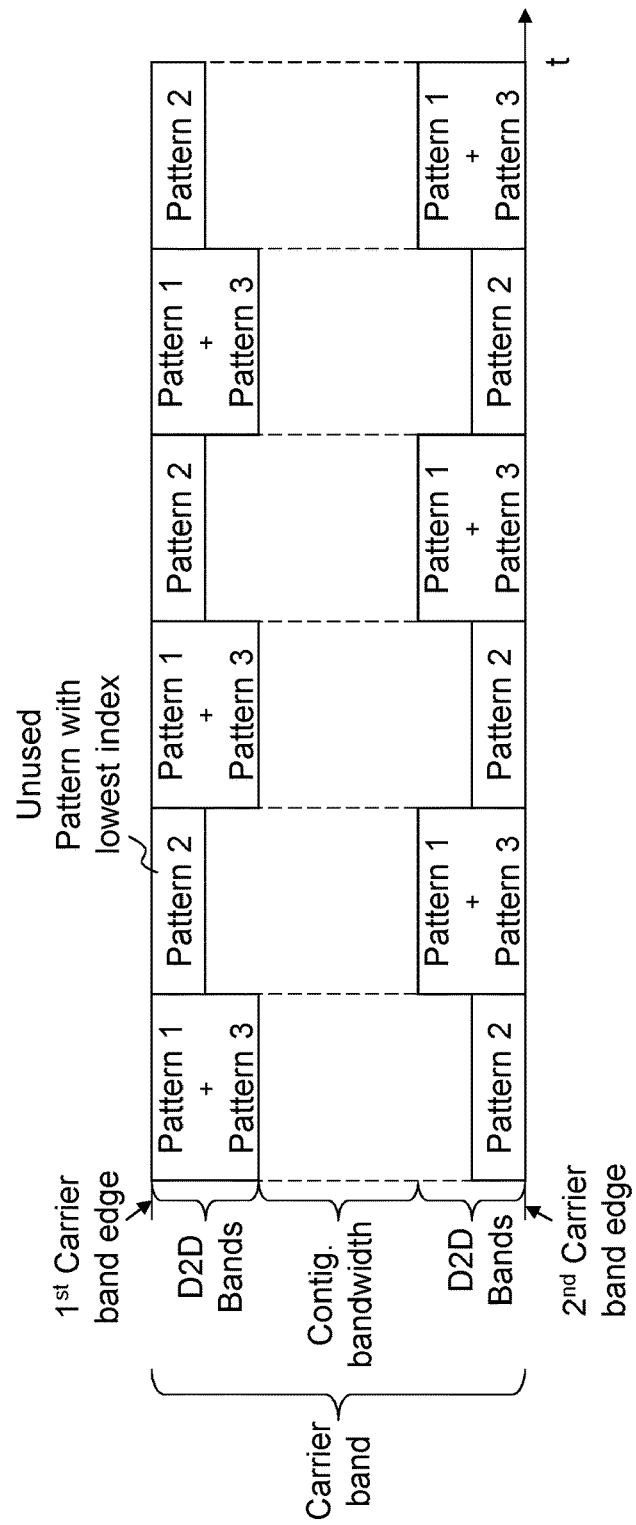
FIG. 11 shows patterns for frequency hopping according to some embodiments herein.

In FIG. 11 the first communication device 10 identifies the second pattern as an interference free pattern, the first pattern being occupied. The second pattern is thus considered as unused pattern with the lowest index, and this index is reported to be used to the second communication device 11 and/or the radio node 12.

In further embodiments, the properties of the patterns are exploited to reduce signaling and simplify detection of interfered patterns. When the first communication device 10 is tasked to report the available D2D radio resources to a control node or another communication device, such as the radio node 12, it performs the following actions:

Identify the interference-free pattern with lowest index, i.e., the pattern that is closest to the carrier band edges, among the available ones;

Signal such pattern, or, similarly, the highest index of the used patterns may also indicate which pattern is unused.

Figure 12:
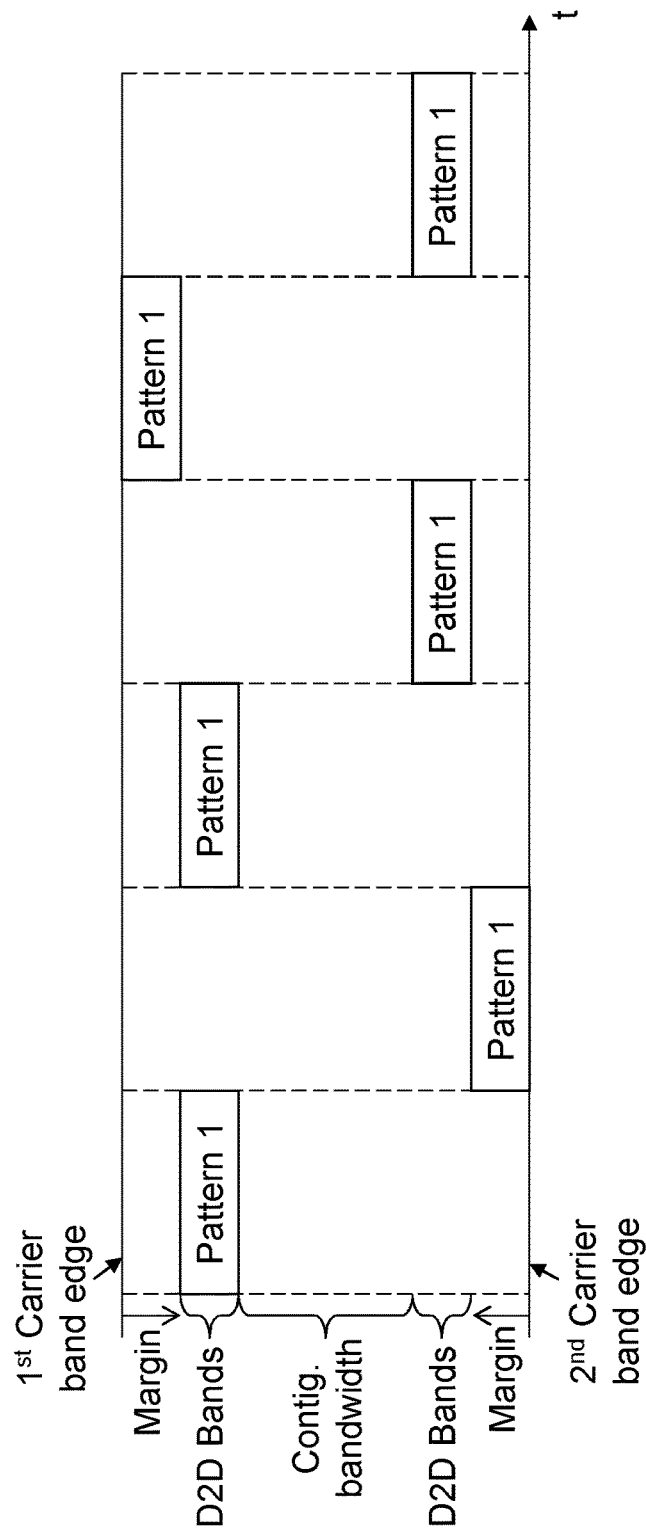
FIG. 12 shows patterns for frequency hopping according to some embodiments herein.

It should be noted, see FIG. 12, that a pattern, such as the first pattern, of radio resource patterns for frequency hopping may be configured for two subbands at each carrier band edge, e.g. such that the first pattern occupies a first subband with a margin to the first carrier band edge and a second subband at the second carrier band edge and do not span a central portion of the carrier band. Still, the first pattern is given a hopping pattern such the D2D radio resources may span different subbands at different time instances within each of the two subbands. In other words, the first pattern may not be restricted to x: {k(x)x; N−1−tx (x)}. Hence, the first pattern or any pattern of the multiple patterns may occupy different frequency subbands at different time instances as long as the contiguous bandwidth is not used.

Figure 13:
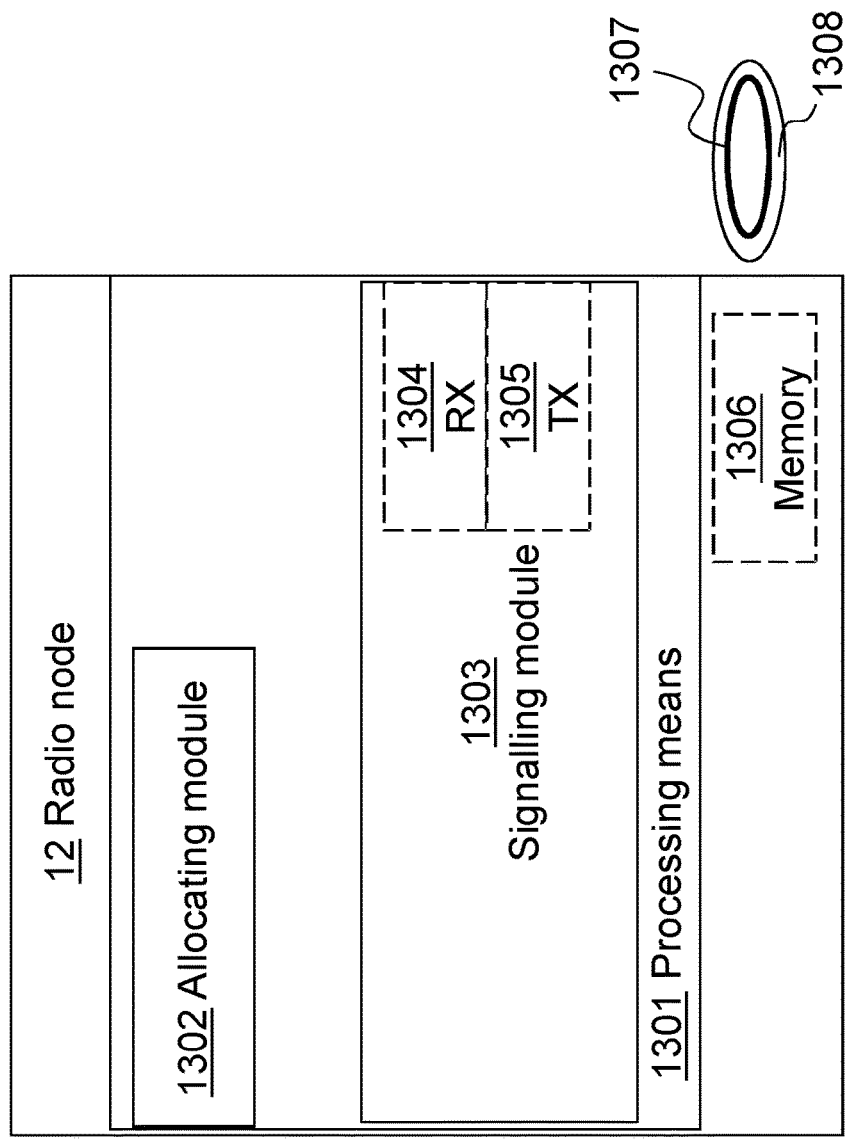
FIG. 13 is a block diagram depicting a radio node according to embodiments herein.

In order to perform methods herein a radio node is disclosed. FIG. 13 shows a block diagram depicting the radio node 12 for enabling communication between the first communication device 10 and the second communication device 11 over a D2D connection in the radio communications network 1 according to embodiments herein. The radio node 12 comprises processing means 1301 configured to allocate radio resource bands of a carrier band for the D2D connection according to at least a first pattern for frequency hopping, wherein the radio resource bands are used for frequency hopping over the carrier band and are at a respective carrier band edge and/or at the respective carrier band edge plus or minus a margin such that a contiguous bandwidth of radio resources between the radio resource bands is not used by the first pattern. The radio node 12 may e.g. comprise an allocating module 1302 configured to allocate the first pattern, or one or more patterns to different D2D connections such that the contiguous bandwidth of radio resources between the radio resource bands is not used by any pattern. The margin may be based on radio resource band of a control channel. The first pattern of multiple patterns employs radio resources with index $$x:\{k_x;N-1-t_x\},$$

wherein N defines a number of radio resource blocks of the carrier band and function $k_x$ defines the margin to a first radio resource block of the first pattern from a first carrier band edge and N−1−$t_x$ defines another radio resource block wherein $t_x$ defines the margin to a second carrier band edge, and x is the index indicating the first pattern. $k_x$ and $t_x$ may be based on index of the first pattern. $k_x$ and $t_x$ may be defined as $$k_x=k'_x+k_0 \text{ and } t_x=t'_x+t_0,$$

wherein $k'_x$ and $t'_x$ are pattern specific and $k_0$ and $t_0$ are common margin values for multiple patterns.

In some embodiments the radio resource bands of a successive or following pattern, such as pattern 2, to the first pattern occupy radio resource bands that occupy a same frequency subband, but at a different time instance than the radio resource bands of the first pattern. Alternatively or additionally, the radio resource bands of a successive or following pattern, such as pattern 3, to the first pattern occupy radio resource bands that are progressively closer to a center carrier of the carrier band than the radio resource bands of the first pattern.

The processing means 1301 is further configured to signal an indication of the allocated radio resources to the first communication device 10 and/or the second communication device 11. The processing means 1301 may further be configured to signal an index, being the indication, of the first pattern to the first communication device 10 and/or the second communication device 11. E.g. the radio node 12 may comprise a signalling module 1303 configured to signal the indication such as the index. An uplink communication by the third communication device 14 to a radio node, such as the radio node 12 or another radio node, may use radio resources of the carrier band, and at least a fraction of the contiguous bandwidth is for an uplink channel.

The processing means 1301 or the allocating module 1302 may further be configured to allocate one or more patterns that are contiguous in frequency domain with the first pattern and configured to combine one or more patterns with the first pattern to obtain a joint pattern of a desired bandwidth. The processing means 1301 or the signalling module 1303 may then further be configured to signal, to the first communication device 10 and/or second communication device 11, an index, being the indication, of the first pattern in the joint pattern with a lowest index when assigning radio resource bands.

The radio node 12 may comprise a receiver, RX, 1304 and a transmitter, TX, 1305, e.g. a transceiver. The radio node 12 further comprises a memory 1306 configured to have data stored thereon, such as applications to perform the methods herein, patterns, channel information, signal information, radio resource information and/or the like.

Figure 14:
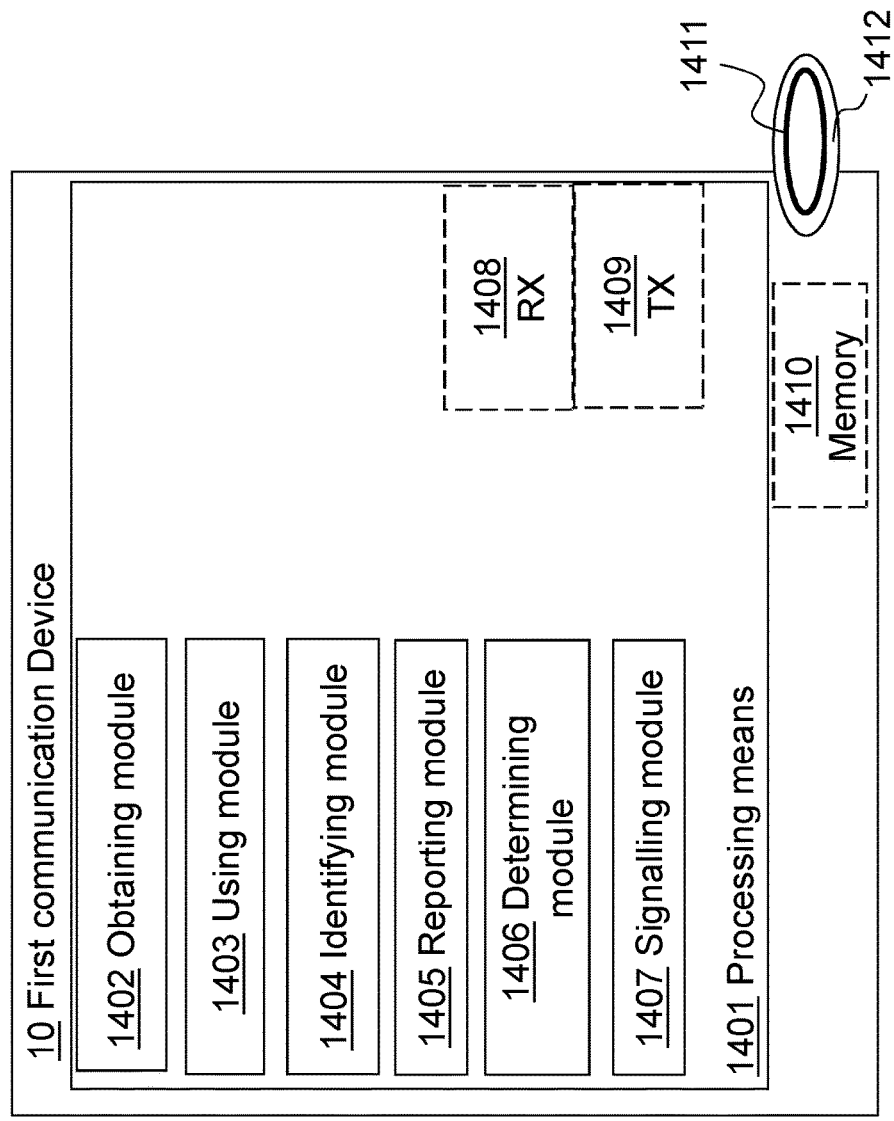
FIG. 14 is a block diagram depicting a first communication device according to embodiments herein.

In order to perform methods herein a radio node is disclosed. FIG. 14 shows a block diagram depicting the first communication device 10 for enabling communication between the first communication device 10 and the second communication device 11 over a D2D connection in the radio communications network 1.

The first communication device 10 comprises processing means 1401 configured to obtain an indication of radio resource bands of a carrier band according to at least a first pattern for frequency hopping for the D2D connection. The radio resource bands are at a respective carrier band edge and/or at the respective carrier band edge plus or minus a margin such that a contiguous bandwidth of radio resources between the radio resource bands is not used by the first pattern. E.g. the first communication device 10 may comprise an obtaining module 1402 configured to obtain the first pattern, e.g. one or more patterns. The processing means 1401 may be configured to receive the indication from a radio node in the radio communications network, or to retrieve the indication from a memory within the first communication device 10. E.g. the obtaining module 1402 may be configured to receive the indication from a radio node in the radio communications network, or to retrieve the indication from a memory within the first communication device 10.

The processing means 1401 is further configured to use the indication when setting up the D2D connection to the second communication device 11. E.g. the first communication device 10 may comprise a using module 1403 configured to use the indication to set up the D2D connection.

The processing means 1401 may further be configured to obtain more than one pattern of radio resources bands and furthermore be configured to identify an interference-free pattern that is closest to the carrier band edges or with a lowest index among the patterns. E.g. the obtaining module 1402 may be configured to obtain more than one pattern and the first communication device 10 may comprise an identifying module 1404 configured to identify the interference free pattern. The processing means 1401 may then be configured to use the identified interference-free pattern to set up the D2D connection. E.g. the using module 1403 may be configured to use the interference free pattern.

The processing means 1401 may be configured to obtain more than one pattern of radio resources bands, and further be configured to identify an interference-free pattern that is closest to the carrier band edges or with a lowest index among the radio resource bands. The processing means 1401 may then be configured to report the index of the identified interference-free pattern to the radio node 12 and/or the second communication device 11. E.g. the first communication device 10 may comprise a reporting module 1405 configured to report the index of the interference free pattern.

The processing means 1401 may further be configured to determine amount of radio resources needed to transmit data. The processing means 1401 may then be configured to take the determined amount into account when setting up the D2D connection. E.g. the first communication device 10 may comprise a determining module 1406 configured to determine the amount radio resources needed and the using module 1403 may configured to use the determined amount when setting up the D2D connection.

The processing means 1401, or the obtaining module 1402, may be configured to obtain a successive or following pattern that is contiguous in frequency domain with the first pattern, and to combine the successive or following pattern with the first pattern to obtain a joint pattern of a desired bandwidth. The processing means 1401 may further be configured to signal, to the second communication device 11 and/or the radio node 12, an index of the successive or following pattern in the joint pattern with a highest index, and/or an index of a pattern used in the D2D connection. E.g. the first communication device 10 may comprise a signalling module 1407 the index of a pattern used in the D2D connection and/or the successive or following pattern in the joint pattern with a highest index.

The first communication device 10 may comprise a receiver, RX, 1408 and a transmitter, TX, 1409, e.g. a transceiver. The first communication device 10 further comprises a memory 1410 that may be configured to have data stored thereon, such as applications to perform the methods herein, patterns, channel information, signal information, radio resource information and/or the like.

Figure 15:
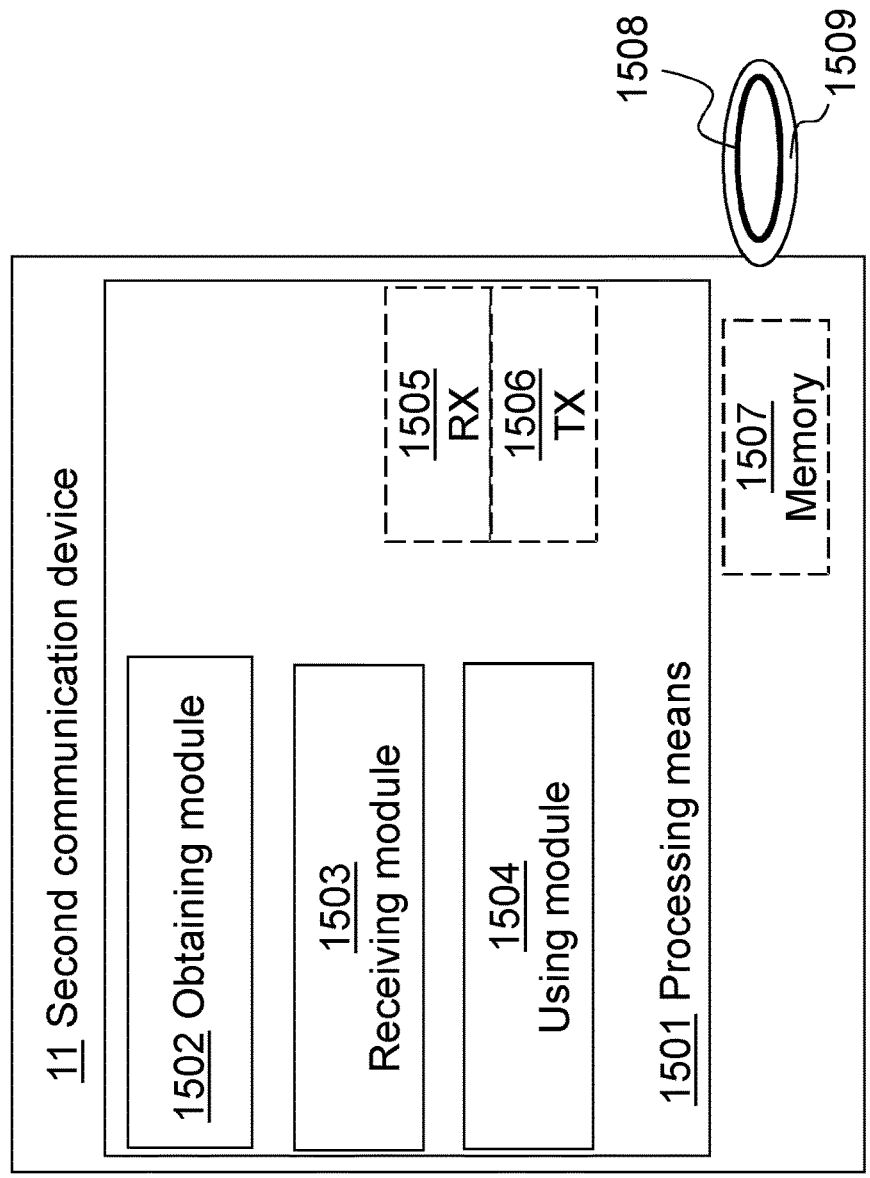
FIG. 15 is a block diagram depicting a second communication device according to embodiments herein.

In order to perform methods herein a second communication device is disclosed. FIG. 15 shows a block diagram depicting the second communication device 11 for enabling communication between the first communication device 10 and the second communication device 11 over a D2D connection in the radio communications network 1.

The second communication device 11 comprises a processing means 1501 configured to obtain an indication of radio resource bands of a carrier band according to at least a first pattern for frequency hopping for the D2D connection. The radio resource bands are at a respective carrier band edge and/or at the respective carrier band edge plus or minus a margin such that a contiguous bandwidth of radio resources between the radio resource bands is not used by the first pattern. E.g. the second communication device 11 may comprise an obtaining module 1502 configured to obtain the first pattern, or one or more patterns.

The processing means 1501 is configured to receive from the first communication device 10 and/or the radio node 12 an indication of radio resources of a pattern, such as the index of a pattern, used in the D2D connection. E.g. the second communication device 11 may comprise a receiving module 1503 configured to receive the indication.

The processing means 1501 is configured to use the pattern indicated by the received index for communicating with the first communication device 10. E.g. the second communication device 11 may comprise a using module 1504 configured to use the pattern indicated by the received indication for communicating with the first communication device 10.

The second communication device 11 may comprise a receiver, RX, 1505 and a transmitter, TX, 1506, e.g. a transceiver. The second communication device 11 further comprises a memory 1507 that may be configured to have data stored thereon, such as applications to perform the methods herein, patterns, channel information, signal information, radio resource information and/or the like.

As will be readily understood by those familiar with communications design, that functions from other means and/or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate communication devices with appropriate hardware and/or software interfaces between them. Several of the functions may be implemented on a processor shared with other functional components of a wireless terminal or network node, for example.

Alternatively, several of the functional elements of the processing means and modules discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers and transmitters will appreciate the cost, performance, and maintenance trade-offs inherent in these design choices.

The methods according to the embodiments described herein for the radio node 12, the first communication device 10 or the second communication device 11 are respectively implemented by means of e.g. a computer program 1307, 1411, 1508 or a computer program product, comprising instructions, i.e., software code portions, which, when executed on at least one processor, cause the at least one processor to carry out the actions described herein, as performed by the radio node 12, the first communication device 10 or the second communication device 11. The computer program 1307, 1411, 1508 may be stored on a computer-readable storage medium 1308, 1412, 1509, e.g. a disc or similar. The computer-readable storage medium 1308, 1412, 1509, having stored thereon the computer program, may comprise the instructions which, when executed on at least one processor, cause the at least one processor to carry out the actions described herein, as performed by the radio node 12, the first communication device 10 or the second communication device 11. In some embodiments, the computer-readable storage medium may be a non-transitory computer-readable storage medium.

The processing means herein may be implemented through one or more processors, together with computer program for performing the functions and/or method actions of the embodiments herein. The computer program mentioned above may also be provided for instance in the form of a data carrier carrying computer program code for performing embodiments herein when being loaded into nodes. One such carrier may be in the form of a CD ROM disc. It is however feasible with other data carriers such as a memory stick. The computer program may furthermore be provided as pure program code on a server and downloaded to the nodes.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method in a radio node for enabling communication between a first communication device and a second communication device over a device-to-device, D2D, connection in a radio communications network, the method comprising:

allocating radio resource bands of a carrier band for the D2D connection according to at least a first pattern for frequency hopping, wherein the radio resource bands are used for frequency hopping over the carrier band and are at a respective carrier band edge and/or at the respective carrier band edge plus or minus a margin such that a contiguous bandwidth of radio resources between the radio resource bands is not used by the first pattern; and signalling an indication of the allocated radio resource bands to the first communication device and/or the second communication device.

2. A method according to claim 1, wherein the first pattern of multiple patterns employs radio resources with index x, where $$x: \{k_x; N-1-t_x\},$$

wherein N defines a number of radio resource blocks of the carrier band and function $k_x$ defines the margin to a first radio resource block of the first pattern from a first carrier band edge and $N-1-t_x$ defines another radio resource block wherein $t_x$ defines the margin to a second carrier band edge, and x is the index indicating the first pattern.

3. A method according to claim 2, wherein $k_x$ and $t_x$ are based on index of the first pattern.

4. A method according to claim 2, wherein $k_x$ and $t_x$ are defined as $k_x=k'_x+k_0$ and $t_x=t'_x+t_0$, wherein $k'_x$ and $t'_x$ are pattern specific and $k_0$ and to are common margin values for multiple patterns.

5. A method according to claim 1, wherein the signalling comprises to signal an index, being the indication, of the first pattern to the first communication device and/or the second communication device.

6. A method according to claim 1, wherein an uplink communication by a third communication device to a radio node uses radio resources of the carrier band, and at least a fraction of the contiguous bandwidth is for an uplink channel.

7. A method according to claim 1, wherein the radio resource bands of a successive or following pattern to the first pattern occupy radio resource bands that occupy a same frequency subband, but at a different time instance than the radio resource bands of the first pattern.

8. A method according to claim 1, wherein the radio resource bands of a successive or following pattern to the first pattern occupy radio resource bands that are progressively closer to a center carrier of the carrier band than the radio resource bands of the first pattern.

9. A method according to claim 8, wherein the allocating) comprises to allocate one or more patterns that are contiguous in frequency domain with the first pattern and the one or more patterns are combined with the first pattern to obtain a joint pattern of a desired bandwidth.

10. A method according to claim 9, wherein the signalling comprises to signal, to the first communication device and/or second communication device, an index, being the indication, of the first pattern in the joint pattern with a lowest index when assigning radio resource bands.

11. A method according to claim 1, wherein the margin is based on radio resource band of a control channel.

12. A method in a first communication device for enabling communication between the first communication device and a second communication device over a device-to-device, D2D, connection in a radio communications network; comprising
obtaining an indication of radio resource bands of a carrier band according to at least a first pattern for frequency hopping for the D2D connection, wherein the radio resource bands are at a respective carrier band edge and/or at the respective carrier band edge plus or minus a margin such that a contiguous bandwidth of radio resources between the radio resource bands is not used by the first pattern; and
using the indication when setting up the D2D connection to the second communication device.

13. A method according to claim 12, wherein the obtaining comprises obtaining radio resource bands of more than one pattern of radio resources bands and the method further comprises
identifying an interference-free pattern that is closest to the carrier band edges or with a lowest index among the patterns; and wherein the using comprises to use the identified interference-free pattern to set up the D2D connection.

14. A method according to claim 12, wherein the obtaining comprises obtaining radio resource bands of more than one pattern of radio resources bands and the method further comprises
identifying an interference-free pattern that is closest to the carrier band edges or with a lowest index among the patterns; and wherein the using comprises to report an index of the identified interference-free pattern to a radio node and/or the second communication device.

15. A method according to claim 12, wherein obtaining comprises receiving the indication from a radio node in the radio communications network or retrieving the indication from a memory within the first communication device.

16. A method according to claim 12, further comprising determining amount of radio resources needed to transmit data and the using is taking the determined amount into account.

17. A method according to claim 12, wherein obtaining comprises to obtain that a successive or following pattern that is contiguous in frequency domain with the first pattern and the using comprises to combine the successive or following pattern with the first pattern to obtain a joint pattern of a desired bandwidth.

18. A method according to claim 17, further comprising signalling, to the second communication device and/or a radio node, an index of the successive or following pattern in the joint pattern with a highest index.

19. A method according to claim 12, further comprising signalling, to the second communication device and/or a radio node, an index of a pattern used in the D2D connection.

20. A method in a second communication device for enabling communication between a first communication device and the second communication device over a device-to-device, D2D, connection in a radio communications network; comprising
obtaining an indication of radio resource bands of a carrier band according to at least a first pattern for frequency hopping for the D2D connection, wherein the radio resource bands are at a respective carrier band edge and/or at the respective carrier band edge plus or minus a margin such that a contiguous bandwidth of radio resources between the radio resource bands is not used by the first pattern;
receiving from the first communication device and/or a radio node, an indication of radio resource bands of a pattern used in the D2D connection; and
using the pattern indicated by the received index for communicating with the first communication device.

21. A radio node for enabling communication between a first communication device and a second communication device over a device-to-device, D2D, connection in a radio communications network, the radio node comprising:
processing means configured to allocate radio resource bands of a carrier band for the D2D connection according to at least a first pattern for frequency hopping, wherein the radio resource bands are used for frequency hopping over the carrier band and are at a respective carrier band edge and/or at the respective carrier band edge plus or minus a margin such that a contiguous bandwidth of radio resources between the radio resource bands is not used by the first pattern; and to
processing means configured to signal an indication of the allocated radio resource bands to the first communication device and/or the second communication device.

22. A first communication device for enabling communication between the first communication device and a second communication device over a device-to-device, D2D, connection in a radio communications network; comprising
processing means configured to obtain an indication of radio resource bands of a carrier band according to at least a first pattern for frequency hopping for the D2D connection, wherein the radio resource bands are at a respective carrier band edge and/or at the respective carrier band edge plus or minus a margin such that a contiguous bandwidth of radio resources between the radio resource bands is not used by the first pattern; and
processing means configured to use the indication when setting up the D2D connection to the second communication device.

23. A second communication device for enabling communication between a first communication device and the second communication device over a device-to-device, D2D, connection in a radio communications network; comprising:
processing means configured to obtain an indication of radio resource bands of a carrier band according to at least a first pattern for frequency hopping for the D2D connection, wherein the radio resource bands are at a respective carrier band edge and/or at the respective carrier band edge plus or minus a margin such that a contiguous bandwidth of radio resources between the radio resource bands is not used by the first pattern;
processing means configured to receive from the first communication device and/or a radio node, an indication of radio resources of a pattern used in the D2D connection; and processing means configured to use the pattern indicated by the received indication for communicating with the first communication device.

\* \* \* \* \*

UNITED STATES PATENT AND TRADEMARK OFFICE
CERTIFICATE OF CORRECTION

PATENT NO. : 10,142,990 B2
APPLICATION NO. : 15/114965
DATED : November 27, 2018
INVENTOR(S) : Sorrentino et al.

It is certified that error appears in the above-identified patent and that said Letters Patent is hereby corrected as shown below:

In the Specification

In Column 12, Line 22, delete "als0" and insert -- also --, therefor.

Signed and Sealed this
Twenty-first Day of May, 2019

Andrei Iancu
*Director of the United States Patent and Trademark Office*